Feb. 20, 1973   G. GUICHARD ET AL   3,717,480
TREATMENT OF GRAIN
Filed Dec. 24, 1970   2 Sheets-Sheet 1
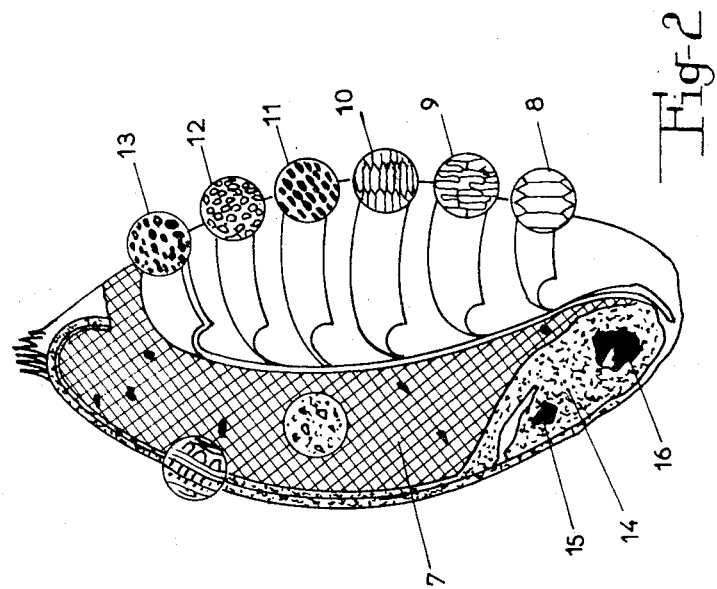
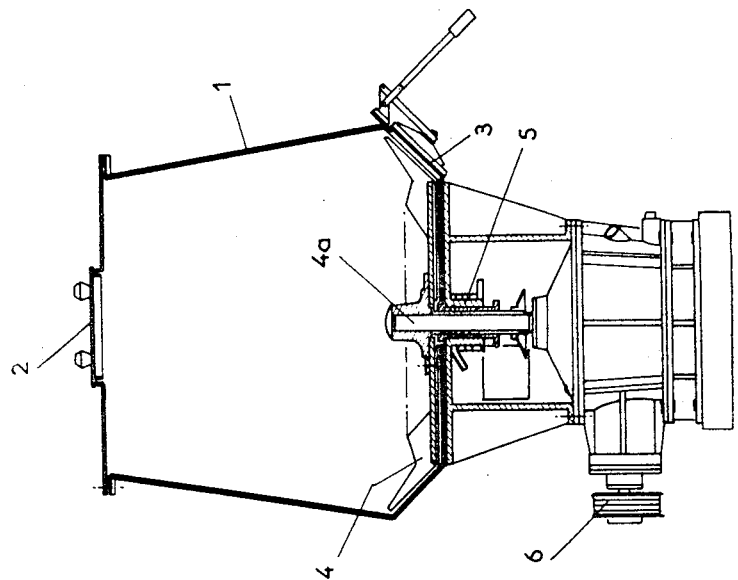
Geoffroy Guichard
Rene Le Bolloch
Inventors.
By Karl F. Ross
Attorney

United States Patent Office 3,717,480
Patented Feb. 20, 1973

3,717,480
TREATMENT OF GRAIN
Geoffroy Guichard, Saint-Cloud, and Rene Le Bolloch, Argenteuil, France, assignors to Societe Milliat Freres, Saint-Cloud, France
Filed Dec. 24, 1970, Ser. No. 101,255
Int. Cl. B02b 3/00
U.S. Cl. 99—233.3       14 Claims

ABSTRACT OF THE DISCLOSURE

A process for treating grain having a multi-layer husk, particularly hard wheat, prior to grinding, comprising abrading the humidified grain batchwise by repeated projection of the grain against an abrasive surface until the desired husk layer has been removed and then separating the removed layer from the grain. The process is preferably carried out in a plurality of stages, the charge of grain being humidified at each stage and the abraded portion separated after each stage. The amount of water added preferably decreases from the first stage to the last while the projection speed of the grains is increased from one stage to the next.

FIELD OF THE INVENTION

The present invention relates to the treatment of grain, particularly hard wheat.

BACKGROUND OF THE INVENTION

The yield in the production of high quality semolina by the grinding of hard wheat is at the present time noticeably less than in the production of flour by grinding soft wheat.

This difference in yield is due to the fact that when hard wheat is ground in the traditional manner, so-called "dressed" semolina grains are obtained which include particles of the outer skin. These grains, separated by sifting, are then subdivided which causes the formation of a mixed flour of kernels and outer husk which it not possible to separate, the density and the capability of fragmentation of the various layers being identical.

It is known that in a grain of wheat, the albumen (flour or semolina) is surrounded by a series of layers of different composition and hardness among which the following layers can particularly be distinguished: the pericarp (epidermis, epicarp and endocarp), the envelope or shell, the nucellar layer and the aleuronic layer. The last named layer constitutes an interesting by-product because it contains a high proportion of proteins. When hard wheat is ground by the usual processes, particles of the aleuronic layer or of the envelope are obtained, to which grains of semolina adhere which it is impossible to separate subsequently without additional loss.

It is possible to eliminate a large part of the layers of certain grains which are outside the albumen by subjecting the grains to abrasion in a single operation prior to grinding them. This process is, however, not applicable directly to hard wheat grain.

It has also been proposed to condition hard wheat grains by agitating them violently after having humidified them in such a way that the humidity penetrates into the epidermic layers and softens the skins joining the various layers. The grains are then rapidly shaken so as to detach the outer husk from the kernel. This process, however, which is carried out continuously, only permits the removal of about 3.7% of the initial weight of the grain, while the layers external to the albumen of a grain of hard wheat represent 15% by weight of the grain. This process, therefore, does not allow of the outer layers to be removed, particularly the entire aleuronic layer. The subsequent grinding of the stripped grains still involves an appreciable loss of semolina.

OBJECTS OF THE INVENTION

It is an object of the present invention to provide a method of cleaning by abrasion grains having an outer husk, which allows this husk to be practically completely removed without breaking the grains.

This method is applicable not only to hard wheat, but also to all grains having a husk with several layers, such as soft wheat, oats, rice, maize and barley.

SUMMARY OF THE INVENTION

According to the invention, there is provided a process for treating grain having a multi-layer husk comprising abrading the humidified grain batchwise by repeated projection of the grain against an abrasive surface until the desired husk layer has been removed and then separating the removed layer from the residual grain.

When a grain meets the abrasive surface a sliver of the husk is detached from the grain by the shock effect. The process is continued until the grain is finally practically completely freed from its husk. It is possible thus to remove from a charge of grain, up to 12% of the waste or even more, without breaking the grains.

It is advantageous to project the grains against the abrasive surface with a speed of between 5 and 50 m./sec. and to direct the grains onto the surface in such a way that the angle of incidence at the surface is between 4° and 60°. Experience has shown that the best results are obtained if these conditions are used. It is also advantageous if the abrasive surface is provided with granules embedded in a substrate surface and projecting from this substrate surface by a distance of between 0.1 and 2 mm.

In one advantageous embodiment of the invention, each charge is abraded in several stages, the charge being humidified at each stage, and the abraded portion being removed from the grain after each stage. It is thus possible to remove successively the various layers of the husk, particularly the aleuronic layer which constitutes the most interesting by-product and which it has not hitherto been possible to isolate in quantity.

The process may, for example, comprise three principal stages such that the peripcarp is removed during the first two stages and the aleuronic layer in the third stage. These three stages are preferably followed as a precaution by a fourth stage intended to remove the last traces of the aleuronic layer.

As previously stated, the grain must be humidified at the time of abrasion. The amount of water added to the grains is preferably such that means humidity level of the abraded grains is between 12.5 and 18.5%. When the abrasion is carried out in several stages, the amount of water added during each stage is preferably decreased from the first to the last stage, the final humidity being between the limits given above. It is possible, for example, to add to the grains at the first stage an amount of water between 2 and 8% by weight, and to add to the grains at the last stage an amount of water between 0.5 and 3.5% by weight, the amount of water added at the intermediate stage or stages being less than that added at the first stage and at least equal to the amount added at the last stage.

The abrasion must be carried out in such a way that the percentage of grains broken is as small as possible. This percentage should be less than 0.5% at the first stage; it may reach 0.5 to 1% during the second stage, 1 to 2% during the third stage and more than 3% at the fourth stage. In fact, the speed at which the grains are projected onto the abrasive surface and therefore their kinetic energy, must increase from one stage to the next, except if desired for the fourth stage, bacause the inner layers to be removed adhere more strongly than the outer layers. In any case, the discontinuity of the abrasion operations is a factor permitting the loss of yield to be reduced to a minimum since the small percentage of broken grains can be recovered before these grains are completely pulverized. The increase in speed must be at least 10% from one stage to the next.

The duration of each stage may be determined by measuring the power required for the abrasion, for example by an ammeter when the apparatus used for carrying out the abrasion is driven by an electric motor. It has been found, in fact, that at any one abrasion stage, this power grows, passes through a peak and decreases; this decrease is due to the presence of abraded products which stick to the abrasive material and between the grains themselves thus reducing the efficiency of this abrasive material. The stage must be stopped before the power has noticeably decreased.

In order to effect abrasion a machine is preferably used which comprises a vessel, the inner wall of which is clad with an abrasive material and in which are located rotating blades directed towards the top of the vessel. The optimum speed of rotation of these blades is determined as a function of the speed to be given to the grains, which is itself determined as previously described.

At the end of the treatment, a grain stripped of its outer husk, particularly of its aleuronic layer is obtained, and which has the beginnings of rupture going from the periphery to the groove which facilitates subsequent grinding.

(5) DESCRIPTION OF THE DRAWING

The invention will now be further described with reference to the drawings, in which:

FIG. 1 is a side sectional view of apparatus suitable for carrying out a process according to the invention;

FIG. 2 is a side view partly in section of a grain of wheat; and

(6) SPECIFIC DESCRIPTION

Figure 3:
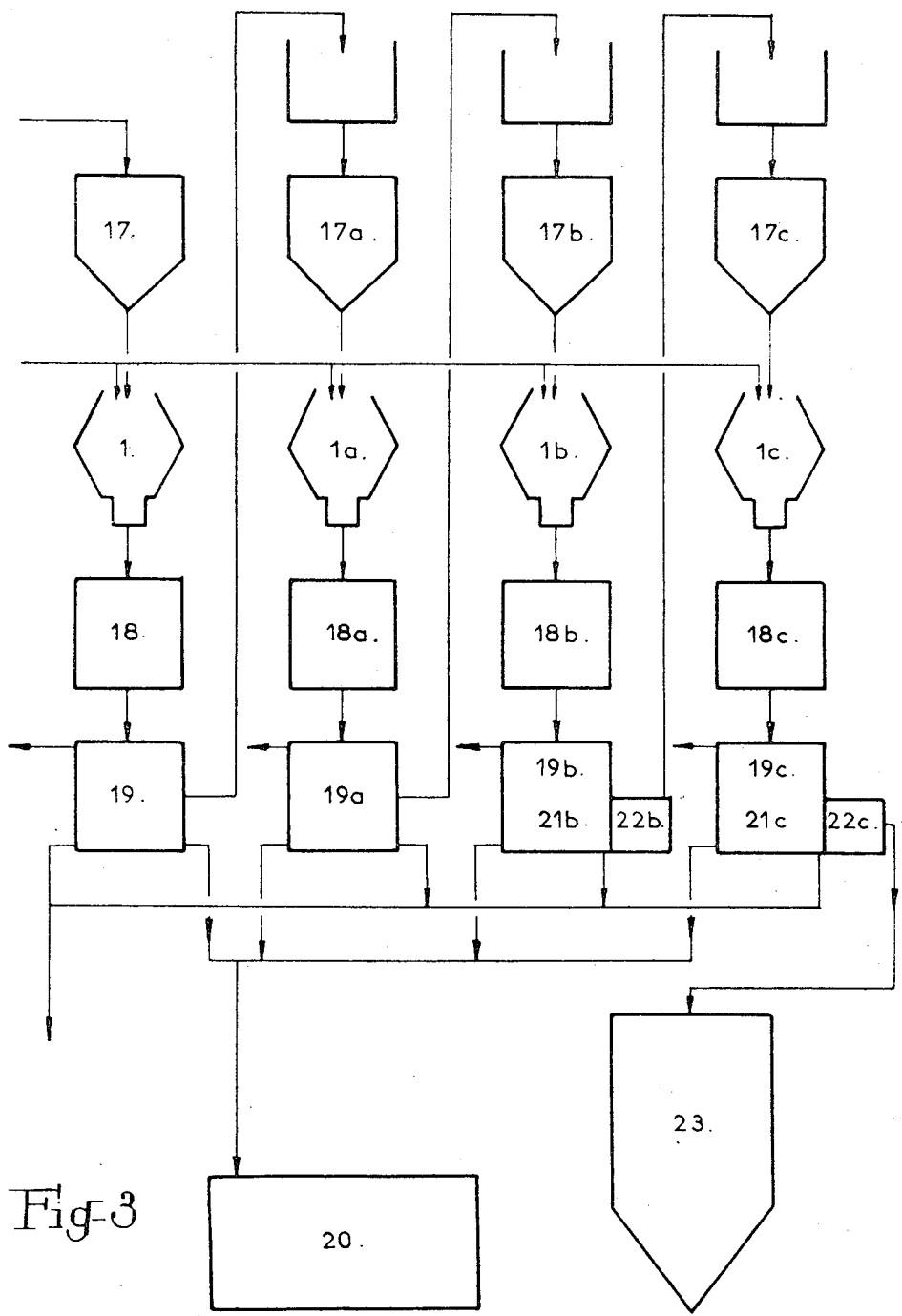
FIG. 3 is a flow diagram for a process according to the invention.

In FIG. 1, an apparatus is shown which can be used to put the process of the invention into practice. This apparatus comprises a vessel 1 having at its upper end a charging opening which can be closed by a cover 2, and at its lower end, a discharge opening which can be closed by a cover 3. In the vessel 1 are located propulsion blades 4 fixed to a shaft 4a mounted for rotation in a housing 5 and capable of being driven by a pulley 6, the latter being itself adapted to be driven through a driving belt by an electric motor (not shown). The blades 4 are inclined to the vertical in such a way that their forward faces in the direction of movement are directed towards the top of the vessel, the inclination of the blades preferably being between 5 and 45°. The blades 4 are covered with a cladding which is at once supple and elastic to render minimal the breaking effect of the blades on the grains to be treated.

The inner wall of the vessel 3 is covered with an abrasive material. This material depends on the grain to be treated. For a small seed, it should show a low relief, while for tubercles, the relief should be higher; for hard wheat grains, the height of the relief may be from a small fraction of millimeter to 2 millimeters. If the contamination, small but existing, of the treated grains by abrasive material risks changing the quality of the grain, the nature of the abrasive material must be taken into account; for example, for hard wheat, for which one of the criteria of purity after removal to the husk is the ash content, there is preferably used an organic covering (e.g. of polyester resin) on graded silicon elements (glass microspheres).

When the blades 4 are set in rotation, they project the grains contained in the vessel against the upper part of the inner wall of the vessel. Each grain thus hits the upper part of the wall of the vessel, is rubbed along this wall and, when its speed becomes too low, falls to the bottom of the vessel onto the grains present there to be eventually taken up by a blade.

As shown in FIG. 2, a grain of wheat comprises an inner part 7, called albumen or endosperm, the grinding of which yields flour or semolina depending on whether soft wheat or hard wheat is used. This albumen is surrounded by a series of layers which are, starting from the outside, the epidermis 8, the epicarp 9, the endocarp 10, these three layers constituting the external pericarp, the shell or envelope 11, the nucellar layer 12 and the aleuronic layer 13. The scutellum is indicated at 14 in which are the germ 15 and the radicle 16. The mean percentage by weight of albumen is about 82.5%.

For treating hard wheat contained in a hopper 17 (FIG. 3), this wheat is introduced into the vessel 1 in such a way that this vessel is not half filled; for example, if the vessel 1 has a capacity of 200 liters, 50 to 75 kgs. of wheat may be placed in the vessel, whilst if the vessel has a capacity of 500 liters, 125 to 200 kg. of wheat may be placed therein. At the same time as the wheat, an amount of water corresponding to about 3% by weight is introduced. The blades of the vessel are then rotated for three minutes at a speed of about 265 r.p.m. in the case of a 200 liter vessel and 210 r.p.m. in the case of a 500 liter vessel. The radius of the blades 4 being about 270 mm. in the case of a 200 liter vessel and about 550 mm. in the case of a 500 litre vessel, the speed given to the grains is respectively 10.5 m./sec. and 12.1 m./s.

The wheat stripped of its outer pericarp layer is fed by way of a silo 18 to an air separator 19 which permits the removal from the wheat of the germ and a few broken grains which are fed to the grinder, and the greater part of the pericarp and a small fraction of the aleuronic layer which is fed to a plane sifter 20.

The precleaned wheat is fed into a second hopper 17a and then introduced again into the vessel 1 or into a similar vessel 1a, together with a quantity of water equal to about 2% by weight of the wheat. The blades of the vessel 1a are rotated for three minutes at about 350 r.p.m. in the case of a 200 liter vessel or at about 260 r.p.m. in the case of a 500 liter vessel.

The wheat is then fed by way of a silo 18a to an air separator 19a, which separates from the wheat a small amount of broken grains and coarse semolina which is fed to the grinder, still a little of the pericarp, and a little of the aleuronic layer which is fed to the plane sifter 20.

The wheat then passes to a third hopper 17b and is introduced into a vessel 1b at the same time as a quantity of water equal to about 1.3% by weight of the wheat. The blades of the vessel 1b are rotated for 3 minutes at a speed of about 400 r.p.m. for a 200 liter vessel and at about 300 r.p.m. for a 500 liter vessel.

After treatment, the wheat is fed to an air separator 19b via a silo 18b. The broken wheat and coarse semolina are fed to the grinder; the by-products constituted to a large part by the aleuronic layer are fed to the plane sifter 20 via a calibrating apparatus 21b. The treated wheat is fed to a brushing device 22b where it is freed from the dust of the aleuronic layer which is extremely fatty and sticky, very rich in ash and would contaminate the wheat.

Finally, the brushed wheat is fed into a fourth hopper 17c and introduced into a vessel 1c together with a quantity of water equal to about 0.5 to 1% by weight of the wheat. The blades of the vessel 1c are rotated for three minutes at about 500 r.p.m. for a 200 liter vessel and at about 350 r.p.m. for a 500 liter vessel.

After the final treatment, the wheat is fed into a silo 18c and then into a cascade box 19c, is cleaned in a brushing device 22c and is collected in a silo 23 from whence it will in due course be fed to the front grinder.

During grinding, it is found that the power required is less than needed to grind an untreated wheat; the power thus saved compensates for that required for abrasion.

(7) SPECIFIC EXAMPLE

In the table below are given the results of comparative tests carried out respectively adding water at each stage and increasing the rate of rotation of the blades at each stage; adding water at each stage but rotating the blades at their minimum speed; adding water at each stage but rotating the blades at their maximum speed; without adding water and increasing the speed of rotation of the blades at each stage; adding all the water at the first stage and increasing the speed of rotation of the blades at each stage; and finally adding all the water to the grain one hour before the first stage and increasing the speed of rotation at each stage.

| Recovered products on dry extract | Addition of water at each stage | | | | | | Treatment dry, increasing speed | | All water added at start, increasing speed | | Wheat conditioned with water 1 hour before start, increasing speed | |
|---|---|---|---|---|---|---|---|---|---|---|---|---|
| | Increasing speed | | Constant minimum speed | | Constant maximum speed | | | | | | | |
| | Percent | Ash, percent | Percent | Ash, percent | Percent | Ash, percent | Percent | Ash, percent | Percent | Ash, percent | Percent | Ash, percent |
| Recovered waste | 12 | 5.10 | 3.92 | 4.17 | 11.65 | 5.20 | 2.70 | 2.96 | 7.35 | 4.89 | 5.10 | 4.45 |
| Recoverable broken wheat | 3.35 | ≠2.60 | 1.96 | ≠2.60 | 9.65 | ≠2.60 | 1.18 | ≠2.60 | 5.55 | ≠2.60 | 4.25 | ≠2.60 |
| Cleaned wheat | 84.45 | 1.29 | 94.12 | 1.69 | 78.70 | 1.29 | 96.12 | 1.80 | 87.10 | 1.52 | 90.65 | 1.60 |
| Balance | 100 | ≠1.81 | 100 | ≠1.81 | 100 | ≠1.81 | 100 | ≠1.81 | 100 | ≠1.81 | 100 | ≠1.81 |
| Starting wheat | 100 | 1.81 | 100 | 1.81 | 100 | 1.81 | 100 | 1.81 | 100 | 1.81 | 100 | 1.81 |

An examination of this table shows that the process described permits 12% of the waste to be recovered, the proportion of broken wheat being only 3.55%; the ash content of the cleaned wheat shows that practically all the husk has been removed. The result is obtained only when water is added at each stage and the speed given to the grains is increased at each stage. In particular, if one adds water at each stage but gives the grains a constant velocity, the proportion of waste recovered is only 3.92% at low speed, but at high speed the proportion of broken wheat rises to 9.65%. On the other hand, if the speed given to the grains is increased at each stage but all the water is added at the beginning of the first stage, the proportion of waste recovered is only 7.35% for a proportion of broken wheat rising to 5.35%; the ash content of the cleaned wheat shows that the wheat still contains a part of the outer husk.

To sum up, the process which has been described:

(1) increases the semolina yield by at least 3%;
(2) increases the capacity of the grinders with corresponding reduction in the manufacturing costs;
(3) allows a part of the whole germ to be selected;
(4) allows, by calibration of the waste, parts coming from the aleuronic layer and comprising 10–20% of the extractable fat, to be collected;
(5) allows the high protein to be extracted and the cellulose cake used up;
(6) improves the quality of the semolina and the dough thanks to the almost complete elimination of the proteins of the aleuronic layer and the enzymes, in particular amylase and protease, in which they are rich.

It goes without saying that the invention is not to be considered as limited by the particular mode of operation described and illustrated, but, on the contrary, covers all variations thereof.

What we claim as our invention and desire to secure by Letters Patent of the United States is:

1. A process for treating grain having a multi-layer husk comprising the steps of: abrading the humidified grain batchwise by centrifugally projecting the grain glancingly against a surface having abrasive particles thereon in a succession of stages until the husk layers have been removed, and separating the removed layers from the residual grain between said stages.

2. A process as claimed in claim 1 wherein each projection of the grain is effected by giving the grains a speed of between 5 m./sec. and 50 m./sec. and directing the grains towards the abrasive surface so that the angle of incidence with this surface is between 5° and 60°.

3. A process as claimed in claim 1 wherein the abrasive surface is formed of granules embedded in a substrate surface and projecting from this surface by a distance of between 0.1 and 2 mm.

4. A process as claimed in claim 1 wherein to humidify the grain a total amount of water is added such that the level of humidity of the abraded grain is between 12.5% and 18.5%.

5. A process as claimed in claim 1 wherein the charge is humidified at each stage.

6. A process as claimed in claim 5 wherein the abrasion is effected in at least three stages.

7. A process as claimed in claim 6 wherein the abrasion is effected in four stages.

8. A process as claimed in claim 5 wherein the amount of water added at each stage decreases from the first stage to the last.

9. A process as claimed in claim 8 wherein an amount of water of between 2 and 8% by weight is added to the grain at the first stage, and an amount of water of between 0.5 and 3.5% by weight is added to the grain at the last stage, the amount of water added at the or each intermediate stage being less than that added at the first stage and at least equal to that added at the last stage.

10. A process as claimed in claim 5 wherein the grains are given a speed increasing by at least 10% from one stage to the next.

11. A process as claimed in claim 1 wherein the abrasion is carried out in a vessel the inner wall of which is covered with abrasive material and in which upwardly directed blades are mounted for rotation about a vertical axis.

12. A process for husking grain having a multilayer husk, comprising the steps of:
abrading the grain in a plurality of successive stages to remove at least part of a husk layer at each of said stages by projecting the grain against an abrasive surface at each stage;
humidifying the grain at each abrasion stage;
separating from the abraded grain at each stage the husk layer portions removed by abrasion; and
terminating each stage when the power required for abrasion of the grain therein begins to decrease.

13. The process defined in claim 12 wherein the abrasive surface is formed by granules embedded in a substrate and projecting therefrom by a distance between 0.1 and 2 mm., the grain being projected in each stage at a speed between 5 m./second and 50 m./second at an angle of incidence to the abrasive surface between 5° and 60°, the speed of the grains increasing by at least 10% from one stage to the next.

14. The process defined in claim 13 wherein the grain is humidified over all of said stages to a level of 12.5 to 18.5%, the humidity of the grain in the first of said stages being provided by adding 2 to 8% by weight water to the grain, the humidity of the grain in the last of said stages being increased by supplying water in an amount between 0.5 and 3.5% by weight, the amount of water added at each of the stages between the first and last stages decreasing successively but being at least equal to that of said last stage.

References Cited
UNITED STATES PATENTS
1,699,441  1/1929  Negro _____ 146—257 X

FOREIGN PATENTS
672,229  5/1952  Great Britain _____ 146—253
659,052  3/1938  Germany _____ 146—253
312,620  5/1929  Great Britain _____ 146—253

ANDREW R. JUHASZ, Primary Examiner

J. F. COAN, Assistant Examiner